United States Patent [19]

Walko et al.

[11] Patent Number: 4,568,418

[45] Date of Patent: Feb. 4, 1986

[54] PROCESS FOR CONVERTING POLYMER SOLUTIONS INTO GRANULES

[75] Inventors: Lee E. Walko; Stephen B. Wallace; Norman Swanson, all of Lake Jackson; Roy M. Cook, Angleton, all of Tex.

[73] Assignee: The Dow Chemical Company, Midland, Mich.

[21] Appl. No.: 443,256

[22] Filed: Nov. 22, 1982

Related U.S. Application Data

[63] Continuation-in-part of Ser. No. 292,093, Aug. 12, 1981, abandoned.

[51] Int. Cl.⁴ ............................................. B01D 1/18
[52] U.S. Cl. .................................... 159/481; 159/44; 159/DIG. 10; 23/313 R; 264/117; 264/121; 264/12; 264/15
[58] Field of Search ................... 264/611, 12, 15, 629, 264/3, 117, 121, 176 F; 159/165, 47, DIG. 10, 4.4, 48.1; 23/312, 313 R; 528/500, 503

[56] References Cited

U.S. PATENT DOCUMENTS 3,508,339  4/1970  Neblett et al. ........................... 34/10
4,212,967  7/1980  Govoni et al. ........................ 528/500

*Primary Examiner*—David L. Lacey
*Attorney, Agent, or Firm*—Benjamin G. Colley

[57] ABSTRACT

Thermoplastic polymer solutions in organic solvents are converted to granules of relatively uniform sizes and a narrow distribution range by passing the polymer solution through a jet nozzle to form a high velocity stream, injecting super heated steam into the high velocity stream to form a suspension of fine polymer particulates in a gas stream, passing the particulates into a heated agglomeration tube having a series of adjoining circular turns of at least 180° wherein the particulates are substantially completely agglomerated into granules and the granules are recovered from the gas stream.

10 Claims, 6 Drawing Figures

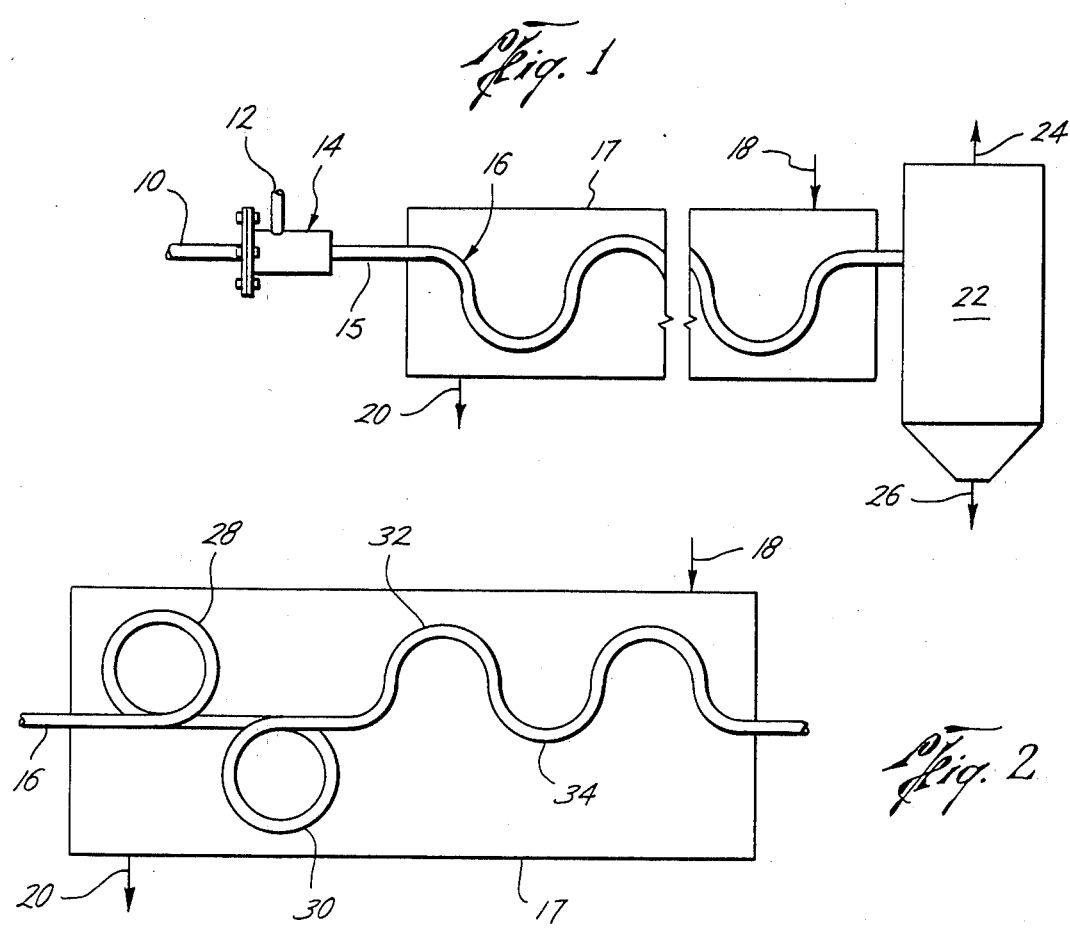
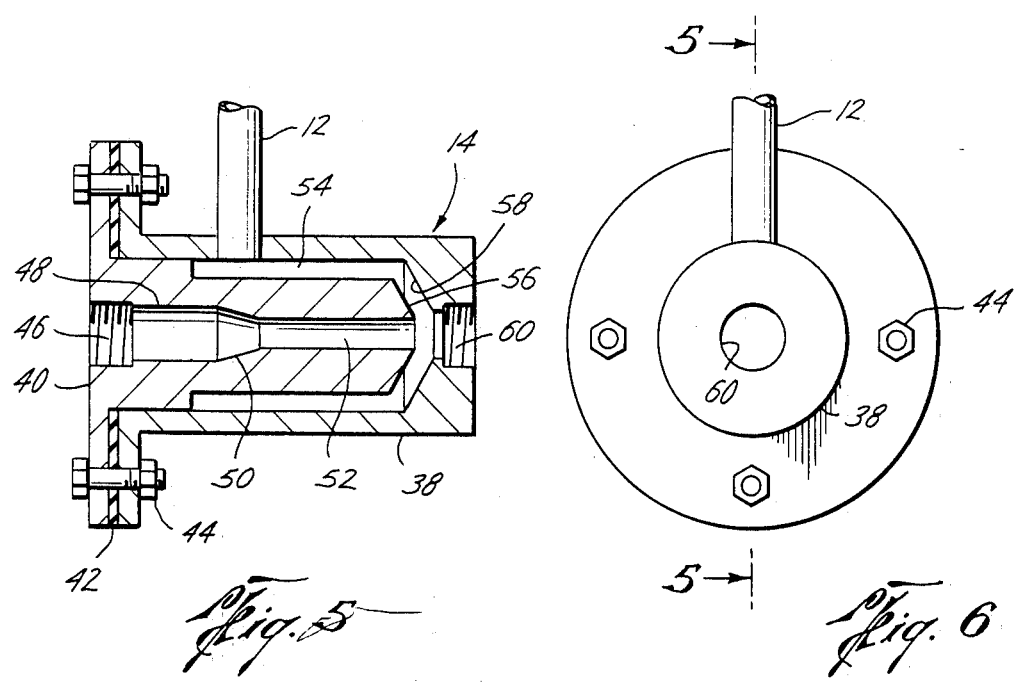

PROCESS FOR CONVERTING POLYMER SOLUTIONS INTO GRANULES

CROSS REFERENCE TO RELATED APPLICATIONS

This application is a continuation-in-part of Ser. No. 292,093 filed Aug. 12, 1981, now abandoned.

BACKGROUND OF THE INVENTION

This invention relates to a process for converting a solution of solidifiable polymer in a volatilizable solvent into a plurality of essentially spheroidal granules.

It is well known in the art that various liquid foodstuffs such as milk, eggs, orange juice, and coffee, etc. can be spray dried by steam or hot air. In U.S. Pat. No. 3,039,107, dated 6-12-62, there is disclosed a method wherein these dried food products are agglomerated by contact with a spray of the untreated liquid food.

It is further known from the following patents that polymeric particulates and/or granules in water slurries can be produced from organic slurries or solutions of various polymers with steam precipitation:

U.S. Pat. No. 2,592,814 (4-15-52)
U.S. Pat. No. 3,050,113 (8-21-62)
U.S. Pat. No. 3,202,647 (8-24-65)
U.S. Pat. No. 3,287,301 (11-22-66)
U.S. Pat. No. 3,306,342 (2-28-66)
U.S. Pat. No. 3,427,370 (2-11-69)
U.S. Pat. No. 3,450,184 (6-17-69)
U.S. Pat. No. 3,596,700 (8-3-71)
U.S. Pat. No. 3,862,103 (1-21-75)

The following patents show that it is known to produce dry or substantially dry polymeric granules from polymer solutions with steam precipitation:

U.S. Pat. No. 3,508,339 (4-28-70)
U.S. Pat. No. 3,804,145 (4-16-74)
U.S. Pat. No. 3,968,003 (7-6-76)
U.S. Pat. No. 4,209,912 (7-1-80)
U.S. Pat. No. 4,212,967 (7-15-80)

In addition to the foregoing, it is known from U.S. Pat. No. 4,252,968 (2-24-81) that polycarbonate powders prepared in U.S. Pat. No. 4,212,967 can be agglomerated in a stirred and heated tubular drier wherein the powders are heated to 165°–190° C.

While the above preparation of polymer granules in water slurries appears to be effective, it is a distinct disadvantage to subsequently separate out the water and remove the residual water absorbed therein. Furthermore, it is a distinct disadvantage in U.S. Pat. No. 4,252,968 to make polymer powders and subsequently agglomerate these in a rotating mechanical device which has the possibility of mechanical breakdowns.

SUMMARY OF THE INVENTION

It now has been discovered that thermoplastic polymer solutions in a volatilizable organic solvent can be converted into a plurality of essentially spheroidal granules of relatively uniform sizes in a relatively simple process.

The process of this invention thus comprises the following steps:

(A) passing a thermoplastic polymer solution in an organic solvent through a jet nozzle to form a high velocity stream, (B) injecting super heated steam into said stream to form a turbulent suspension of fine polymer particulates in a gas stream of vaporized organic solvent and steam, (C) passing said suspension into a heated agglomeration tube having a series of adjoining circular turns of at least 180° sufficient in number to cause the agglomeration of substantially all of the fine particulates into larger sized essentially spheroidal granules and wherein the residence time of said suspension in said tube is sufficient for substantially complete agglomerization of said particulates, and (D) separating the granules from said gas stream.

DESCRIPTION OF THE DRAWINGS

FIG. 1 shows the apparatus used in the instant process which includes a steam precipitator 14, an agglomerization tube 16, and a cyclone 22.

FIG. 2 shows a modification of the agglomerization tube wherein the serpentine tube of FIG. 1 is modified to include 360° turns.

FIG. 5 is a cross section view of the steam precipitator taken on line 5—5 of FIG. 6.

FIG. 6 is an end view of the steam precipitator.

DETAILED DESCRIPTION OF THE DRAWINGS

Figure 3:
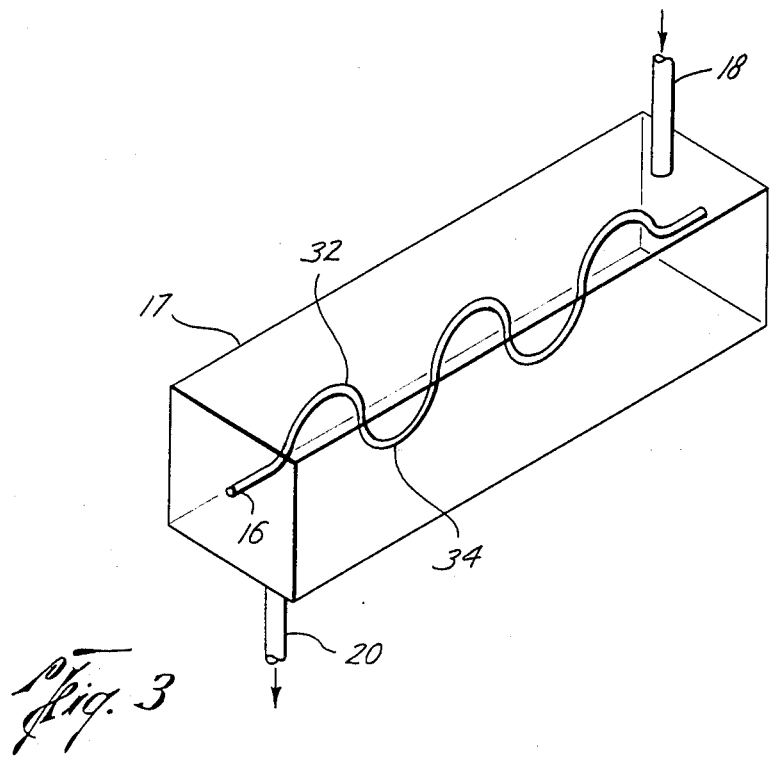
FIG. 3 shows an isometric view of the tube and shell shown in FIG. 1.

In the drawings, the steam precipitator is generally shown at 14. An inlet pipe 10 conveys a polycarbonate solution in an organic solvent to the precipitator 14 where it is contacted with superheated steam from the steam inlet 12. A connector pipe is shown at 15 which is screwed into and joins the steam precipitator 14 and the agglomerization tube 16. The necessary connecting couplers are not shown.

The tube 16 is supported by supports (not shown) in a heating shell 17 which is shown to be rectangular but can be cylindrical if desired. The shell 17 is heated to the proper drying temperature by low process steam which comes in the inlet 18 and is removed by the outlet 20.

The particles which become granules are blown by the steam pressure into a cyclone separator 22 which has an upper outlet 24 for water vapor and organic solvent vapor and a lower outlet 26 for granules.

The tube 16 can have various configurations such as upper 360° turns 28 and lower 360° turns 30 as well as upper 180° turns 32 and lower 180° turns 34 and various combinations of these such as a series of 360° turns followed by a series of 180° turns or alternating 180° turns and 360° turns all in one vertical plane as is illustrated in FIG. 2.

Figure 4:
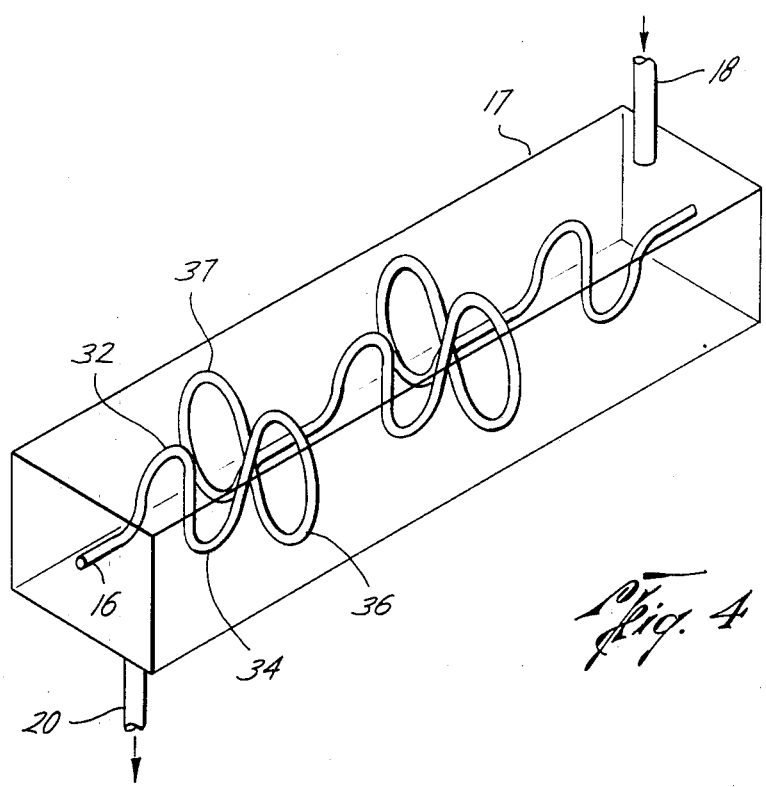
FIG. 4 shows an isometric view of a modified tube and shell showing a series of 180° turns in a vertical plane combined with transverse 360° turns.

In a similar manner, the 180° turns 32 and 34 can be alternated with transverse 360° turns 36 and 37 in a different plane as is illustrated in FIG. 4.

The polymer solution enters the steam precipitator 14 at the threaded inlet 46 and flows through the large internal bore 48 to the restriction 50 where the velocity is greatly increased. The polycarbonate solution flows out of the jet nozzle 52 into the flow of superheated steam which flows from inlet 12 through internal space 54 around the conical bevel 56 and into the polycarbonate solution at a velocity sufficient to disintegrate the solution into stream of fine particles suspended in the superheated steam which exits out of the threaded outlet 60.

The steam precipitator 14 is provided with an inner body 40 which is adjustable with respect to the outer body 38 by means of one or more shims 42. Fastening means such as bolts and nuts 44 are provided to keep the assembly together. By means of the shims 42 a proper spacing between the conical bevel 56 and the conical seat 58 is provided which will give a thin sheet of superheated steam at the proper velocity to break up the stream of polycarbonate into fine particles.

DETAILED DESCRIPTION OF THE INVENTION

In the process of this invention, a polymer solution in an organic solvent is pumped into a jet nozzle to form a stream having a velocity in the range from about 1 to 100 feet per second and preferably 10 to 50 feet per second. While polycarbonate solutions in methylene chloride, ethylene dichloride or monochlorobenzene are preferred, other thermoplastic polymers such as polyethylene, polystyrene, polybutadiene, polyisoprene and the like can also be processed when they are dissolved in suitable volatilizable organic solvents.

Superheated steam having a temperature in the range from about 100° to 500° C. and preferably in the range from 190° to 230° C. is then injected in a conical stream into the polycarbonate stream to break up the polycarbonate solution into a fine mist of polymer particles suspended in the steam and vaporized solvent.

The suspension is blown into the agglomeration tube having a series of circular turns wherein the particles are heated by rolling contact with the hot inner walls of the tube so that they become sticky and adhere to each other but not to the walls of the tube due to the velocity of the gas stream through the tube. As the particles pass through the tube they constantly roll over and over due to the plurality of turns and become substantially larger and more or less spherical.

In the preferred form of the agglomeration tube, the tube consists of a serpentine tube having a series of about 6 to 20 upper and lower 180° turns in the same plane. While the actual number of turns is not critical, it has been found that in general one must use at least 6 turns to achieve adequate rounding of the granules and on the other hand amounts greater than 20 require a greater gas pressure to push the granules through the tube or pipe turns and can cause partial or complete blockage of the tube. The same design criteria applies to the other more complex configurations.

The exterior walls of the tube are heated by process steam so as to maintain a uniform temperature in the range from about 80° C. to 170° C. and preferably a range from 125° C. to 150° C.

In general, the residence time of the particles in the tube is in the range from about 0.01 to 60 seconds and preferably in the range from 0.1 to 2 seconds. It is to be understood that the residence time is a direct function of several variables such as the feed rates of the superheated steam and/or the polycarbonate solution, the temperature of the superheated steam and the temperature of the process steam used to heat the agglomeration tube. In any event, the residence time is so chosen that the particulates are substantially completely agglomerated into larger sized granules of a random shape which can generally be described as rounded, spheroidal, bead-shaped, etc. Some of the granules are oblate spheriods and some are rather like flat pebbles but the majority appear to be essentially spheroidal. An important feature of this invention is that the granules are of an essentially uniform size range or mesh range with very little dust or powder.

The granules are carried by the gas stream into a conventional cyclone separator wherein the organic solvent vapor and water vapor are taken overhead for recovery of the solvent by condensation. The granules are removed from the bottom and are further processed by mechanical indirect steam dryers to remove residual water and solvent before being processed in a conventional vented extruder and chopper to achieve polycarbonate pellets of suitable purity for molding and/or sale.

The invention is further illustrated by the following examples which are presented to illustrate the invention further:

EXAMPLE 1

300 lb./hr. of a 10% polycarbonate solution at 25° C. using methylene chloride as the solvent was fed to a steam precipitator as shown in FIG. 1 of the drawings. 115.5 lb./hr. of 200 psig utility steam (200° C.) was also applied to the precipitator.

The internal dimensions of the precipitator were 0.312" I.D. on the polycarbonate injection barrel and 0.375" on the mixing throat. The steam flow area was adjusted to give a 30 psi pressure drop across the annulus.

A fine dispension of minute polycarbonate particulates was formed in the mixer. The particulates were then carried into the agglomeration tube. The particulates were in a tacky state and were recombined into a spherical-like granules. This was done thru the alternating circular turns in the agglomeration tube. The tube was made of $\frac{3}{8}$" stainless steel tubing with an I.D. of 0.305" and was 7' in length. The tube contained 20 bends of 180° each similar to FIG. 1 of the drawing wherein each bend had an inside radius of about one inch.

Eighteen lb./hr. of 40 psig utility steam (132° C.) was used to control the heat to the shell. The average heat transfer coefficient for the shell was 135 BTU/hr. ft.$^2$-°F.

The final polycarbonate granules obtained from the cyclone contained 40% $H_2O$, by weight and 1.5% methylene chloride. The dry bulk density of the polycarbonate granules was 0.2 grams per cubic centimeter. The product distribution was between #4 and #12 mesh (U.S. Sieve Series) with 86% by weight in the #4 to #8 mesh range.

EXAMPLES 2-7

A 10% by weight polycarbonate solution in methylene chloride feed solution was fed at various rates in pounds per hour to a steam precipitator as shown in FIG. 1 of the drawings using essentially the process parameters of Example 1. The apparatus had an agglomeration tube made from a 0.625 inch outside diameter 316 stainless steel tube (18 BWG gage). The tube was bent into a series of 15 turns of 180° with an inside radius of 2.625 inches.

The superheated steam rate was also varied to give a constant polymer solution to steam ratio of 3.95 to 1.

The recovered granules were given a sieve analysis and the results of each example are set forth in Table I.

TABLE I

| Example | Polymer Feed Rate (lbs./hr.) | U.S. Sieve Analysis (% of Total wt.) | | | |
|---|---|---|---|---|---|
| | | >3 | >4 | >8 | <8 |
| 2 | 1040 | 28.8 | 56.2 | 14.5 | 0.5 |
| 3 | 1000 | 29.6 | 55.6 | 14.6 | 0.2 |
| 4 | 950 | 22.7 | 55.4 | 21.9 | 0.1 |
| 5 | 900 | 20.1 | 53.7 | 25.7 | 0.4 |
| 6 | 875 | 20.4 | 53.3 | 25.9 | 0.4 |
| 7 | 850 | 17.6 | 46.4 | 35.6 | 0.3 |

The above data indicates that the process of this invention produces a mixture of various size granules wherein a substantial majority of the granules are greater than U.S. Sieve #4 (0.187 inches) and very few of the granules are less than U.S. Sieve #8 (0.0937 inches).

We claim:

1. A process for converting a thermoplastic polymer in a solution of a volatilizable organic solvent into a plurality of essentially spheroidal agglomerates of relatively uniform sizes which comprises
   (A) passing said solution through a jet nozzle to form a high velocity stream,
   (B() injecting super heated steam into said stream to form a turbulent suspension of fine polymer particulates in a gas stream of vaporized organic solvent and steam,
   (C) passing said suspension into a uniformly heated serpentine agglomeration tube having a uniform diameter and having a series of at least 6 semi-circular turns wherein the residence time of said suspension in said tube is sufficient for substantially complete agglomeration of said particulates, and
   (D) separating the granules from said gas stream.

2. The process as set forth in claim 1 wherein said superheated steam has a temperature in the range from 100° to 500° C., said heated tube has a temperature in the range from 80° to 170° C., and said residence time is in the range from 0.01 to 60 seconds.

3. The process as set forth in claim 1 wherein said superheated steam has a temperature in the range from 190° to 230° C., said heated tube has a temperature in the range from 125° to 150° C., and said residence time is in the range from 0.1 to 2 seconds.

4. In a process for converting a thermoplastic polymer in a solution of a volatilizable organic solvent into a plurality of essentially spheroidal agglomerates of relatively uniform sizes wherein said solution is passed through a jet nozzle to form a high velocity stream, superheated steam is injected into said stream to form a turbulent suspension of fine polymer particulates in a gas stream of vaporized organic solvent and steam, said suspension is passed into a uniformly heated serpentine agglomeration tube having a uniform-diameter and the granules from said gas stream are recovered, the improvement which comprises providing a series of, at least 6 semi circular turns in said tube.

5. The process is set forth in claim 4 wherein said superheated steam has a temperature in the range from 190° to 230° C., said heated tube has a temperature in the range from 126° to 150° C., and said residence time is in the range from 0.1 to 2 seconds.

6. A process for converting a polycarbonate polymer in a solution of a volatilizable organic solvent into a plurality of essentially spheroidal agglomerates of relatively uniform size which comprises,
   (A) passing said solution through a jet nozzle to form a high velocity stream,
   (B) injecting super heated steam into said stream to form a turbulent suspension of fine polycarbonate particulates in a gas stream of vaporized organic solvent and stream,
   (C) passing said suspension into a uniformly heated serpentine agglomeration tube having a uniform diameter and having a series of at least 6 semi-circular turns wherein the residence time of said suspension in said tube is sufficient for substantially complete agglomeration of said particulates, and
   (D) separating the granules from said gas stream.

7. The process as set forth in claim 6 wherein said superheated steam has a temperature in the range from 100° to 500° C., said heated tube has a temperature in the range from 80° to 170° C., and said residence time is in the range from 0.01 to 60 seconds.

8. The process as set forth in claim 6 wherein said superheated steam has a temperature in the range from 190° to 230° C., said heated tube has a temperature in the range from 125° to 150° C., and said residence time is in the range from 0.1 to 2 seconds.

9. In a process for converting polycarbonate polymer in a solution of a volatilizable organic solvent into a plurality of essentially spheroidal agglomerates of relatively uniform sizes wherein said solution is passed through a jet nozzle to form a high velocity stream, superheated steam is injected into said stream to form a turbulent suspension of fine polymer particulates in a gas stream of vaporized organic solvent and steam, said suspension is passed into a uniformly heated serpentine agglomeration tube having a uniform-diameter and the granules from said gas stream are recovered, the improvement which comprises providing a series of at least 6 semi-circular turns.

10. The process as set forth in claim 9 wherein said superheated steam has a temperature in the range from 190° to 230° C., said heated tube has a temperature in the range from 125° to 150° C., and said residence time is in the range from 0.1 to 2 seconds.

* * * * *